(12) United States Patent
Grupp et al.

(10) Patent No.: US 6,364,072 B1
(45) Date of Patent: Apr. 2, 2002

(54) SINTERED MATERIAL FOR A MAGNETIC TRACK BRAKE

(75) Inventors: Friedemann Grupp, Krefeld; Uwe Kröger, München; Eckart Saumweber, Gauting; Wolfgang Schröer, Lauenburg; Wolfgang Valentin, Glinde, all of (DE)

(73) Assignees: AlliedSignal Bremsbelag GmbH, Glinde; Knorr-Bremse Systeme für Schienenfahrzeuge GmbH, München, both of (DE)

(*) Notice: Subject to any disclaimer, the term of this patent is extended or adjusted under 35 U.S.C. 154(b) by 0 days.

(21) Appl. No.: 09/067,371

(22) Filed: Apr. 27, 1998

(30) Foreign Application Priority Data

Apr. 28, 1997 (DE) .................... 297 07 550 U
Feb. 4, 1998 (EP) ............................ 98101858

(51) Int. Cl.⁷ .................... F16D 69/04; F16D 65/092
(52) U.S. Cl. ............................................ 188/165
(58) Field of Search .................... 188/165, 251 A, 188/251 M

(56) References Cited

U.S. PATENT DOCUMENTS

| 3,434,998 A | * | 3/1969 | Adrich et al. | 188/251 M |
| 3,485,331 A | * | 12/1969 | Volker et al. | 188/251 M |
| 3,660,120 A | * | 5/1972 | Clark et al. | 106/36 |
| 3,703,224 A | * | 11/1972 | Bray | 188/251 M |
| 4,311,524 A | * | 1/1982 | Genkin et al. | 188/251 M |
| 4,350,530 A | * | 9/1982 | Kamioka | 188/251 M |
| 4,391,641 A | * | 7/1983 | Lloyd | 188/251 M |
| 4,415,363 A | * | 11/1983 | Sanftleben et al. | 188/251 M |
| 4,438,004 A | * | 3/1984 | Myers | 188/251 M |
| 5,028,494 A | * | 7/1991 | Tsujimura et al. | 428/614 |
| 5,161,654 A | * | 11/1992 | Valentin | 188/251 R |
| 5,358,684 A | * | 10/1994 | Valentin | 419/10 |
| 5,862,891 A | * | 1/1999 | Kroger et al. | 188/164 |

FOREIGN PATENT DOCUMENTS

EP 0581988 * 2/1994 ............ 188/251 M

\* cited by examiner

Primary Examiner—Christopher P. Schwartz
(74) Attorney, Agent, or Firm—Friedrich Kueffner

(57) ABSTRACT

A sintered material is used as a friction material for a pole shoe area of a magnetic track brake, having at least one of a magnetic basic member and a carrier member. The sintered material contains at least one of a proportion of pulverized wear inhibitor and a proportion of powder forming a protective layer.

23 Claims, 13 Drawing Sheets

Detail A

Detail B

Detail C

SINTERED MATERIAL FOR A MAGNETIC TRACK BRAKE

BACKGROUND OF THE INVENTION

1. Field of the Invention

The invention relates to a sintered material for a magnetic track brake, more particularly to an eddy current brake and/or magnetic track brake according to the preamble of claim 1, a magnetic track brake as well as a pole shoe for a magnetic track brake comprising such a sintered material.

In magnetic track brakes according to the state of the art, preferably St37 steel was employed as friction material. What proved disadvantageous though in the use of a St37 friction layer was that build-up deposits occurred increasingly, which severely reduced the braking power of the brake. In order to restore the same, it was necessary to remove the build-up deposits by hand, which caused high maintenance costs. The employment of GGG40 spherulitic graphite iron did, it is true, result in fewer deposits forming, however, with friction layers of that type it was only possible to apply weak braking forces.

2. Description of the Related Art

A further problem with magnetic track brakes according to the state of the art concerned the connection of the friction material to the carrier member or the basic member. According to the state of the art, this connection is established by sintering, bonding or by welding. While the sintered connection broke open frequently already when weak shearing forces were applied, the bonded connections were subject to the disadvantage that they called for intermediate layers, in whose transition areas to the friction material block, crack formations and/or corrosions occurred so that an underfilm corrosion of the friction material block may take place gradually at one side which could lead to an impairment of the braking effect and—in an extreme case—to a failure of the brake lining. The bonding of the friction material to the carrier or supporting plate does, when manufacturing the brake lining by the thermal treatment of the bonding material, also calls for relatively long application times, which result in low production figures. A shortening of the application times of the thermal treatment of the bonding material is only possible by accepting an inadequate adhesive connection. Often the roughness of the surfaces to be bonded is also insufficient for making an adequate adhesion possible. That is why it has already been proposed in the DE-U1-82 D1 404, to provide the carrier plate on the side carrying the firction material block with a sinter-fused mounting bed of individual form-fitting shaped members with undercuts, recesses or suchlike, upon which the pressed-on friction material in the form of blocks is attached while filling in the undercuts, recesses or the like of the individual shaped members. However, in practical operation it has been shown that the adhesion continues to be inadequate since mechanical forces as well as occuring vibrations lead to a breaking up of the connection. The microscopically small shaped members forming a rough surface area are moreover comprised of a material other than the remaining mounting bed material, for which reason, by and large, a bed of homogeneous composition is formed, which, when subjected to loads or forces, tends to form cracks or to break apart. To this is added the circumstance that, on the connection point with a mounting bed, in lieu of one connection surface, two connection surfaces have to be provided, viz. the area of transition from the friction material body to the mounting bed and from the mounting bed to the carrier member.

From the EP-A-0 581 988, a brake block and a method for its fabrication as well as a magnetic track brake for road and rail vehicles, more particularly also for rail vehicles travelling at high or higher speeds is known. In order to render the connection of a carrier member on a friction material block for a brake block for road and rail vehicles safer, it is proposed here that the block of friction material be non-positively and/or form-fittingly embraced on several adjacent surface area portions not located in one plane by parts of the cast carrier member. This is achieved in that the finished sintered member is placed in a casting mold and the carrier member material is cast around the same. The brake block according to the EP-A-0 581 988 is characterized in that at least the friction material block is non-positively and form-fittingly encompassed on several adjacent surface area portions not located in one plane by parts of the cast carrier member. Thus not merely a connection of two adjoining, possibly roughened, surface areas is provided, but a connection which embraces the friction material block on the lateral surface portions or on all sides. The geometrically simplest connection, by way of example, resides in that the square brake block, on one of its front surfaces and on the lateral surfaces adjacent hereto, is embraced in its entirety or in part by the cast carrier member. In such a case, the lateral embracing pieces serve as supporting areas for the absorption of shearing forces or, by way of amplification, it is in this case also proposed to provide the friction material block and the cast carrier member on one front surface and/or on two oppositely located lateral surfaces with contourings in the form of elongated protuberances which, appropriately configured, intermesh and provide a natural positive locking of the cast carrier member around the friction material block.

SUMMARY OF THE INVENTION

It is the technical problem of the present invention to state a friction material for a magnetic track brake which is distinguished by a negligible tendency to forming build-up deposits as well as a track brake or a pole shoe for a magnetic track brake, which permits adequate application times and with which sufficiently powerful braking forces are generated.

This technical problem is resolved by means of a sintered material comprising a proportion of pulverized wear inhibitor and/or a proportion of powder forming a protective layer as well as by a magnetic track brake having a magnetic flux-carrying area and/or a magnetic flux-separating area, at least, in part, in the form of a friction material that is a sintered material comprising a proportion of pulverized wear inhibitor and/or a proportion of powder forming a protective layer, in which case the invention also includes a pole shoe for a magnetic track brake wherein the pole shoe is comprised of a sintered material comprising a proportion of pulverized wear inhibitor and/or a proportion of powder forming a protective layer. The invention consequently consists in that a sintered material is made available as friction material for a pole shoe, a pole shoe area or pole shoe friction areas for a magnetic track brake comprising at least a proportion of pulverized wear inhibitor and/or a proportion of powder forming a protective layer.

As pulverized wear inhibitor, by preference one or combinations of several of the following substances are employed: $Al_2O_3$, $ZrO_2$, $Al_2TiO_5$, $Y_2O_3$, $SiC$, $Si_3N_4$, $WC$, $Cr_3C_2$, $TiC$.

The powder forming the protective layer is preferably selected from one of the following substances: Spherulitic graphic iron, graphite, iron sulfide, manganese sulfide, lead, molybdenum sulfite.

In a preferred embodiment, the sintered material may also possess a proportion of magnetically conductive powder, by way of example, iron powder.

A particularly wear-resistant composition of the sintered material as friction material is:
- 80% to 99% magnetically conductive material and optionally non-conductive material;
- 0.5% to 5% molybdenum sulfite
- 0.5% to 5% carbon
- 0.5% to 2% silicon carbide.

If the sintered material in its first embodiment comprises 80% to 99% of a magnetically conductive material, in that case the same possesses a proportion of iron. If the sintered material comprises a magnetically non-conductive material, then the same possesses preferably several or combinations of the following substances:
- tin, copper, zinc, nickel, aluminum or alloys of these substances, by way of example, bronze, brass, nickel silver.

According to a further aspect of the invention, it is intended to provide a low-maintenance track brake, in which no build-up deposits occur or merely in a very thin and small form, i.e. negigible deposits and which, over and above that, allows application times that are approximately comparable with the previous steel members. The braking power is identical with or superior to that of the track brakes with steel members employed up to now.

The pole shoe area carrying magnetic flux of a trach brake has to meet the following prerequisites:
- Generation of the magnetic power of attraction (adhesive power),
- Perform friction work(braking)—without the occurrence of build-up deposits.

Both these preconditions are met when a magnetic track brake of the type in question comprises a sintered material according to the invention, in which connection it was surprising that it did prove possible to meet the prerequisites and to achieve the advantages with the composition stated in the foregoing. A pole shoe area carrying a magnetic flux of this composition assumes both tasks, viz. to generate a magnetic adhesive power and to perform friction work.

Further constructions of the invention are described in the subclaims.

Apart from the application of the sintered material in the form of a coating, the sintered material may also be executed in the form of a compact block of friction material which is secured on the basic and/or carrier member.

In a first embodiment, the carrier member can be cast and, at the connection point to the friction material block, may possess on at least two oppositely located sides, elongated ribs or protuberances each with undercuts, which engage non-positively and form-fittingly into pertinently adapted grooves or recesses on the block of friction material. A special embodiment of such a non-positive and form-fitting connection is a dovetailed accommodation space as is known in e.g. guideways. In this case, the friction material block, preferably on its rear, in the form of a broad rib with undercuts on both sides, is provided with the positive dovetail, while the carrier member possesses an appropriately adapted negative recess. The rib in question or different protuberances with undercuts are formed already in the course of the fabrication of the friction material block along with the latter so that the rib, together with the remaining friction material block, forms a homogeneous shaped member. Since the carrier member with its contouring reaches into the undercuts, in which case also the carrier member constitutes a material-specific part, already by the construction of the external contour, a breaking up of the connection point is very largely ruled out.

According to a further embodiment of the invention, the ribs or protuberances on the one hand and the pertinently configured grooves or recesses on the other are provided on all sides of the carrier member or block of friction material are provided while in each case interlocking.

As already mentioned, according to a special embodiment of the friction material member, on the connection area facing away from the active brake surface and the lateral surfaces adjoining hereon, is embraced by the carrier member across a predetermined height, in which case the lateral surfaces can be constructed so as to be smooth or likewise provided with a contouring in the form of a rib with undercuts. By preference, the carrier member and the friction material block terminate flush with each other on the sides or on the front surface.

As material for the friction material block, inter alia also a sintered material and/or the carrier member, grey cast iron, spherulitic graphite iron or cast steel are employed, in which case the sintered material possesses the material composition stated in the claims 1 to 7.

From an aspect of process engineering, a connection between the friction material block and the basic or carrier member can be established in that the block of friction material, in a powder-metallurgical manner, after the finishing sintering, is subsequently placed in a casting mold and is completely or in part cast around so that a non-positive and/or form-fitting connection of the thusly cast carrier member to the block of friction material is created. The contouring configurations or the macro serratio or denticulation in the form of ribs or other protuberances with undercuts or also grooves or recesses are incorporated prior to the sintering, during the sintering or subsequent to the sintering in to the friction material block. By the casting of the block of friction material immersed in the cast material, the carrier member is joined form-fittingly within the region of the immersion depth woth the contour of the friction material block so that, after the cooling, a rigid connection exists between the friction material block and the carrier member.

By preference, the casting temperature is selected so high that the casting material diffuses into the marginal zones of the friction material block, eg.g. up to 20 um, so as to obtain in this zone an atomic diffusion bond. Hereby the form fitting is improved further. The advantage of the aforedescribed process consists in that it is possible to rationalize the fabrication further since the otherwise necessary sintering for securing the friction material block to a carrier plate or to the basic or carrier member is dispensed with just like the roughening of the connection areas, the insertion and pretreatment of intermediate layers and the application of possible connecting means, such as adhesives or solder.

The pole shoe areas separating the magnetic flux may, on the underside forming the friction surface, be provided with a thin, extremely wear-resistant, antimagnetic coating comprising the sintered material according to the invention, which is shockproof and temperature-stable and which prevents the formation of build-up deposits. It is also possible for each pole shoe to be comprised of different materials and areas, of which one area assumes the generation of the magnetic adhesive power and the other area takes over the performance of the friction work.

BRIEF DESCRIPTION OF THE DRAWING

Embodiment examples of the invention are depicted in the drawings. Thus

DESCRIPTION OF THE PREFERRED EMBODIMENT

Figure 1:
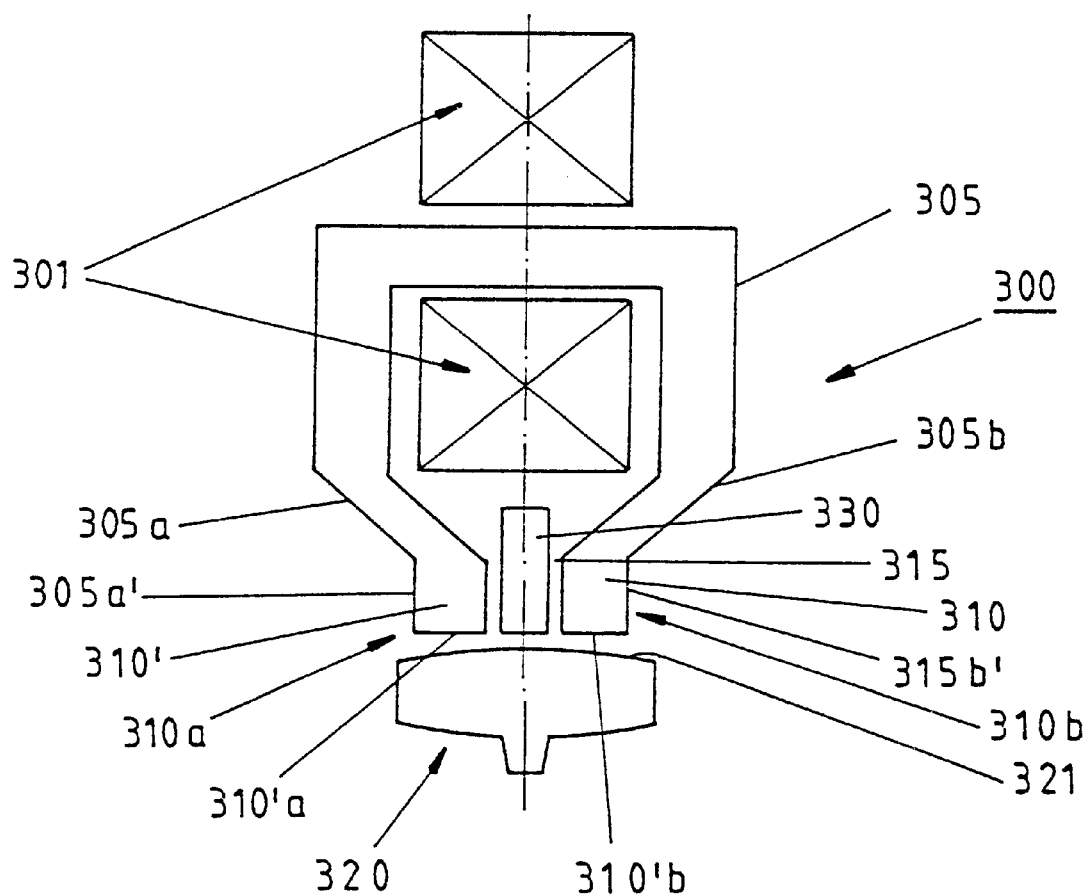
FIG. 1 shows a schematic view of a track portion with a magnetic track brake with pole shoes and a block of friction material according to the invention.
Figure 2:
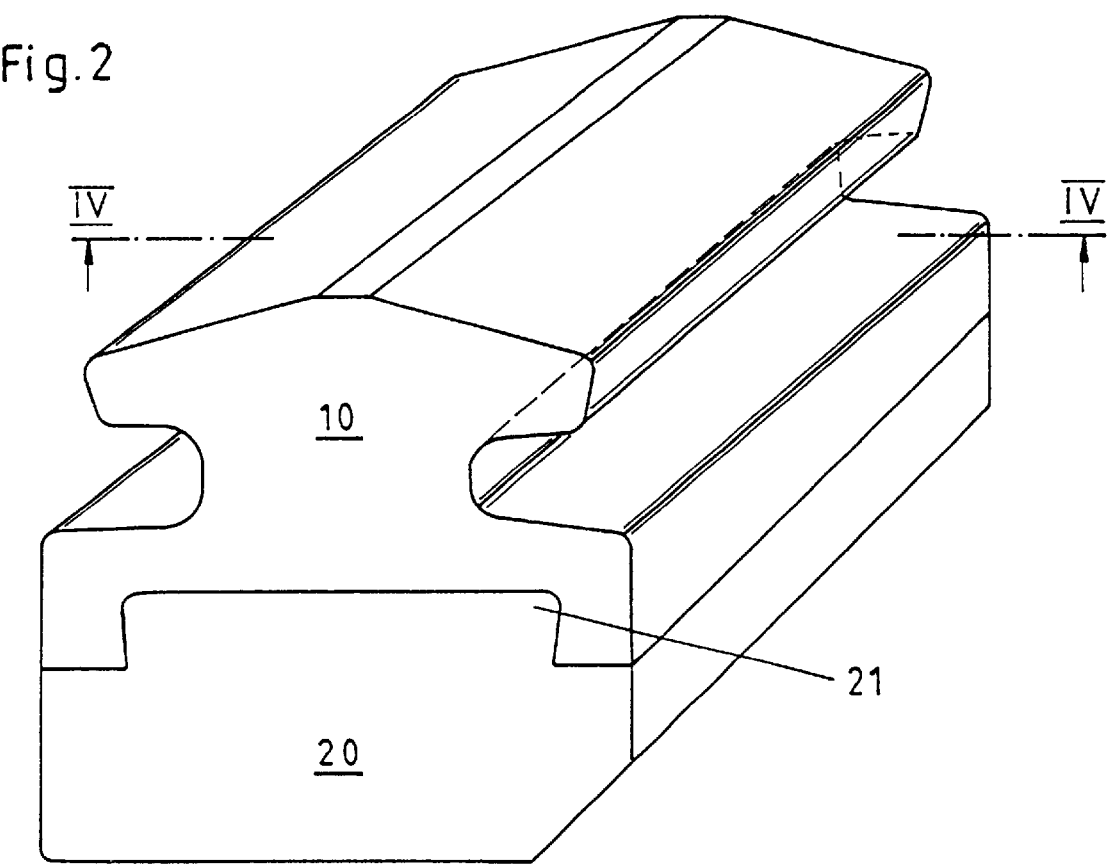
FIG. 2 shows a perspective view of a friction material block with a carrier member obtained by casing around the block.

The preferably described magnetic track brake 300, in particular, an eddy current brake, according to FIG. 1 is comprisedof a coil 301 elongated in the direction of a track 320 and of a magnetic core 305, whose legs 305a,305b are constructed so as to be reduced in the direction of their free extremities, whose ends run out into two parallelly proceeding leg sections 305a', 305b', which, at the end, carry pole shoes 310,310' with front ends facing the head 321 of the track 320 on pole shoe friction surfaces 3q0a, 310'a.

In the interspace 315 between the left-hand and the right-hand pole shoe 310,310' (north pole or south pole), an antimagnetic, extremely wear-resistant, shockproof and temperature-stable intermediate strip 330 is disposed, which is detachably connected by means of a depression or screwed connection or non-detachably by being welded on to the pole shoes 310,310', in which case the intermediate strip 330 does not have to fill the interspace 315.

Each pole shoe 310,310' or each pole shoe friction surface 310a,310'a comprises in the embodiment shown a friction material block 40 comprised of a sintered material comprising a proportion of pulverized wear inhibitor and/or a proportion of a powder forming a protective coating, in which case the sintered material, when employed as in the present case within the area carrying magnetic flux, preferably possesses the following composition:

80% to 99% iron
0.5% to 5% molybdenum sulfite
0.5% to 5% carbon
0.5% to 2% silicon carbide, it being also possible to effect a different distribution of the percentages by weight, should this become necessary. Each pole shoe 310,310' or each pole shoe friction surface 310a, 310'a is comprised of blocks 20 or 40 constructed in a single piece or in multiple pieces secured to a carrier member 10 or 30. In this construction, adjacent surface portions 23, 24, that are not located in one plane, of at least one friction material 20, 40 are non-positively and/or form fittingly embraced by parts 13,14,31,32,33 of the cast carrier member 10,30 (FIGS. 2, 3,4,5 and 6).

In the FIGS. 2 to 5, the connection of a metallic cast carrier member 10 with the friction material block 20 serving as friction layer is shown. The carrier member 10, for the attachment on the magnetic track brake or on a receiving portion of the magnetic track bryke, possesses the configuration known from the state of the art, which is mushroom-shaped (in cross section). On the connection point, in the direction of the friction material block 20, the carrier member 10 possesses a rib-like recess over its entire length, into which form-fittingly and non-positively, a corresponding configured wide rib 21 of the friction material block 20 engages. The combination of carrier member 10 with friction material block 20 can also be executed independently of a magnetic track brake in the form of a particularly wear-resistant brake block.

Figure 3:
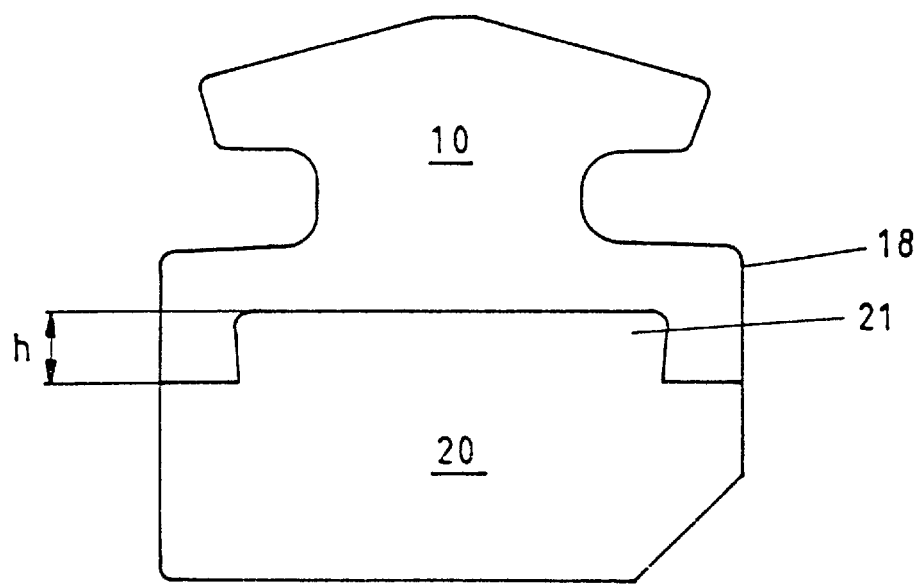
FIG. 3 shows a front view of the friction material block with carrier member as per FIG. 2.
Figure 4:
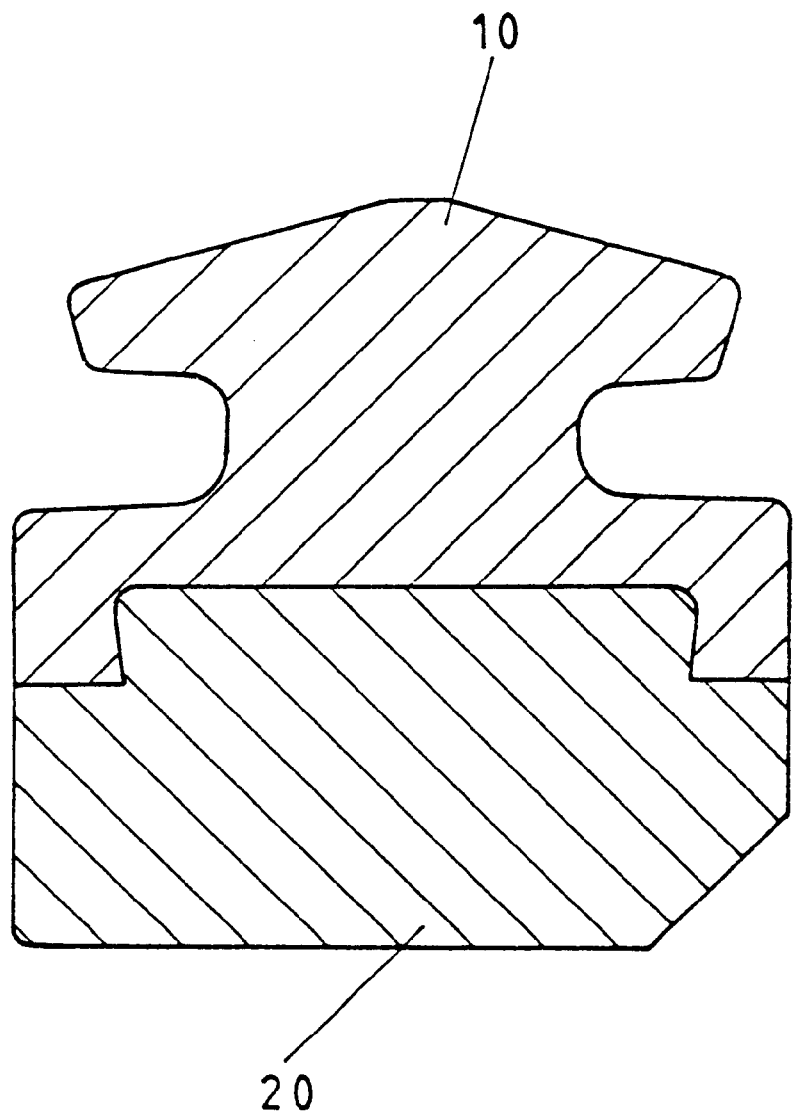
FIG. 4 shows a section in the direction of the Line IV—IV in FIG. 2.
Figure 5:
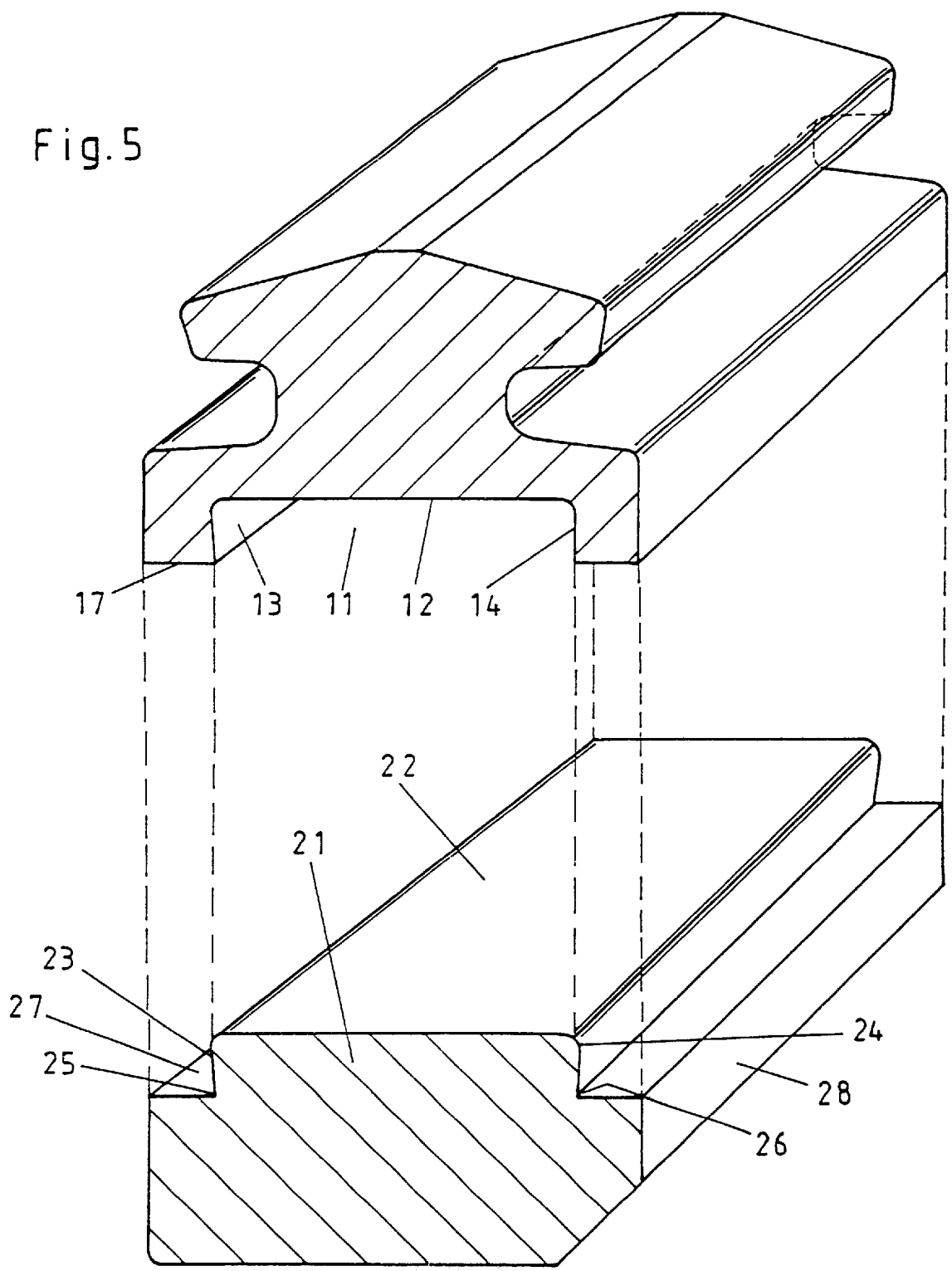
FIG. 5 shows in a diagrammatical exploded view the carrier member and the friction material block.

The rib 21 is trapezoidally configured in cross-section (FIGS. 4 and 5) with the top side or surface 22 as the larger side or surface. The lateral surfaces 23,24 can be disposed at any trapezoidal angle relative to the basic side or area, in which case the angle, in connection with the respective length of the lateral surfaces 23 and 24 is formed in such a way that a pulling off or breaking out from the friction material block from the carrier member is effectively prevented. Important in this case are the undercuts 25 and 26, which may also be executed in a non-linear manner, e.g. with wavy ribs or different contouring configurations. The construction of a large-surface raised portion, as in the shape of the rib 21, is predetermined by the pressing tool or in the sintering process. Since the finished pressed friction material block 20, above the level h depicted in FIG. 3, is immersed into the liquid casting material of the carrier member and the casting is subsequently cooled, the carrier member, within the depth of immersion h, rests on all sides against the friction material block 20. Consequently, on account of the casting-technical fabrication, the groove-like recesses 11 with front surfaces 12 as well as lateral surfaces 13 and 14 are formed so as to correspond to the rib 21, which rest form-fittingly against said surfaces 22 to 24 of the friction material b lock 20 or the rib 21. This applies in a corresponding fashion to the front surfaces 17 and 27 of the carrier member 10 and the friction material block 20. However, the friction material block 20 may also be provided with a groove, into which, subsequent to the casting, a pertinent rib of the carrier member engages. In the case illustrated in the FIGS. 2 to 5, the friction material block and the carrier member each possess an identical length and an identical width, for which reason the external surfaces 18 and 28 likewise form a uniformly flush surface, as the front surface discernible from FIG. 3.

Figure 6:
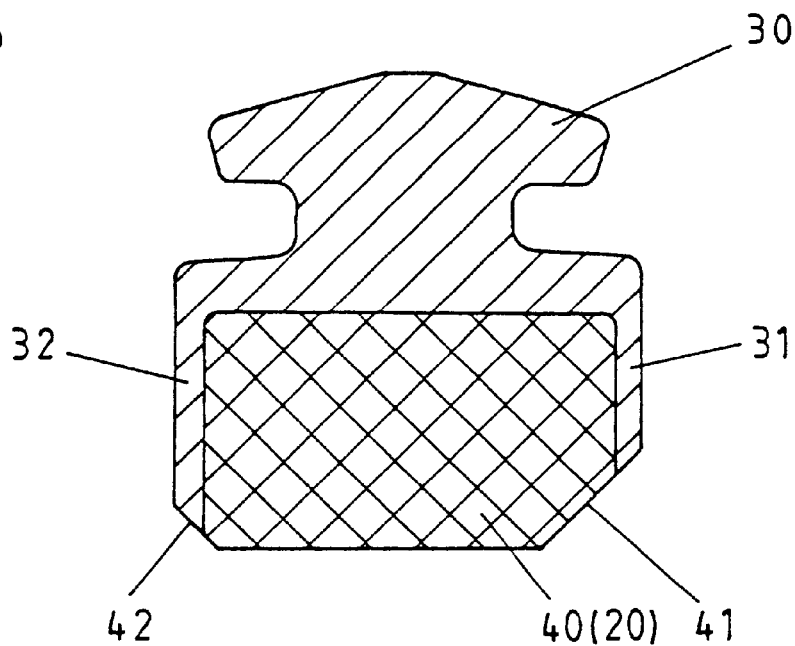
FIG. 6 shows a vertical section of a further embodiment of the invention, in which the friction material block is laterally encompassed by the cast carrier member.
Figure 7:
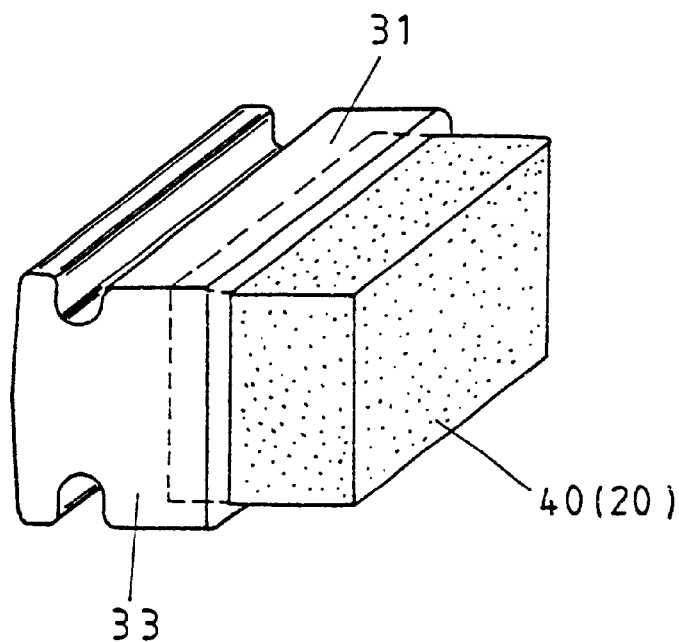
FIG. 7 shows a diagrammatical view of an embodiment, in which the friction material block is encompassed on all sides by the cast carrier member.

Whereas, according to the FIGS. 2 to 5, in the combination dedpicted there of carrier member 10 and of friction material block 20, the friction material block encompasses solely within the area of the rib 21, in the embodiment according to FIGS. 6 and 7, the friction material block 40 is, on its lateral surfaces, completely encompassed (FIG. 6) or in part (FIG. 7) by the sides 31 and 32 of a cast carrier member 30. The overlapping section may exist on oppositely located sides 31 and 32 or on all sides, as demonstrated with the aid of the front surface 33 in FIG. 7. At any rate, the carrier member 30 possesses an essentially square cavity, in which the friction material block 40 is completele or partially embedded. The front edges may, depending on requirement or purpose, be provided with chamferings 41,42, as can be gathered from FIG. 6.

Figure 7A:
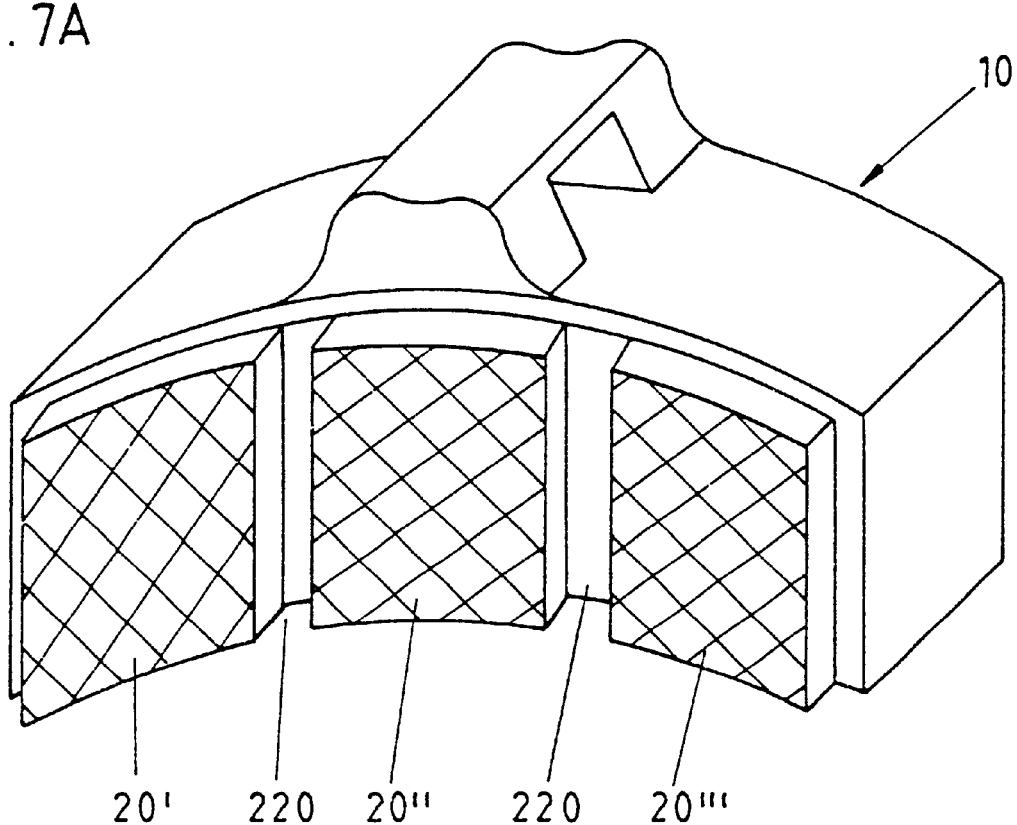
FIG. 7A shows in a diagrammatical view a further embodiment with several friction material blocks that are encompassed on a plurality of sides by a cast carrier member.

According to the embodiment illustrated in FIG. 7A, the brake block is likewise comprised of a metallic cast carrier member 10 with several friction material surfaces 20', 20", 20'" serving as friction layer, which are retained and surrounded without interspaces by the carrier member 10, in which case, however, also a disposition of the individual friction material blocks 20', 20", 20'" at intervals with the formation of interspaces 220 is possible. When the carrier member 10 is cast, these interspaces 220 can also be filled with the material of the carrier member 10.

Whereas, according to the one embodiment, the carrier member 10 is comprised of a metallic, cast shaped member, the possibility exists over and above that of likewise fabricating the carrier member 10 from a sintered material possessing preferably the following composition:

80% to 99% iron
0.5% to 5% molybdenum sulfite
0.5% to 5% carbon
0.5% to 2% silicon carbide.

According to the embodiment depicted in FIG. 1, each of the two pole shoes 310,310' or their pole shoe friction surfaces 310a, 310'a of a friction material block 40 possessing the composition detailed in the foregoing.

Such magnetic track brakes 300 are increasingly employed in rail vehicles travelling at high and higher speeds, in which frictional forces are transmitted to the track direct. The direct current flowing on the magnetic coil 301 brings about a magnetic voltage that produces a magnetic flux in the magnetic core 305, which closes above the track head 321. The pressure force in such magnetic track brakes is in this case generated by an electromagnet lowered on to the tracks for braking. By the application of an induction current, a magnetic field is formed, due to which the magnetic core 305 is drawn against the track. On the legs 305a', 305b', the friction material blocks 40 are disposed, to be more precise, with the insertion of carrier members to which the friction material blocks 40 are secured. Apart from a disposition of the friction material blocks 40 on the legs 305a,305b or on the leg sections 305a',305b', the possibility also exists of arranging the friction material blocks 40 in the legs. Finally, the pole shoes 310,310' or the pole shoe friction surfaces 310a,310'a are provided with such friction material blocks 40 or are themselves constructed in the form of friction material blocks (FIGS. 1, 6 and 7).

The sintered material used for the friction material block 40 possesses, in the pole shoe areas carrying magnetic flux, as its composition shows, metallic proportions so as to make an adequate induction, i.e. an adequate magnetic flux, possible. Within the areas not carrying magnetic flux, which comprise the sintered material according to the invention, this possesses a high proportion in weight of material that is not magnetically conductive, as e.g. tin, copper, zinc, nickel or aluminum or compositions or alloys of these substances.

In all the described cases the friction material block 20 or 40 is first of all fabricated by sintering and subsequently cast on to the carrier member. The securing of the friction material block 20 or 40 to a cast carrier or basic member adapted to the configuration of the friction material block may also be effected by means of screwed connections or by means of other suitable connections.

Figure 8:
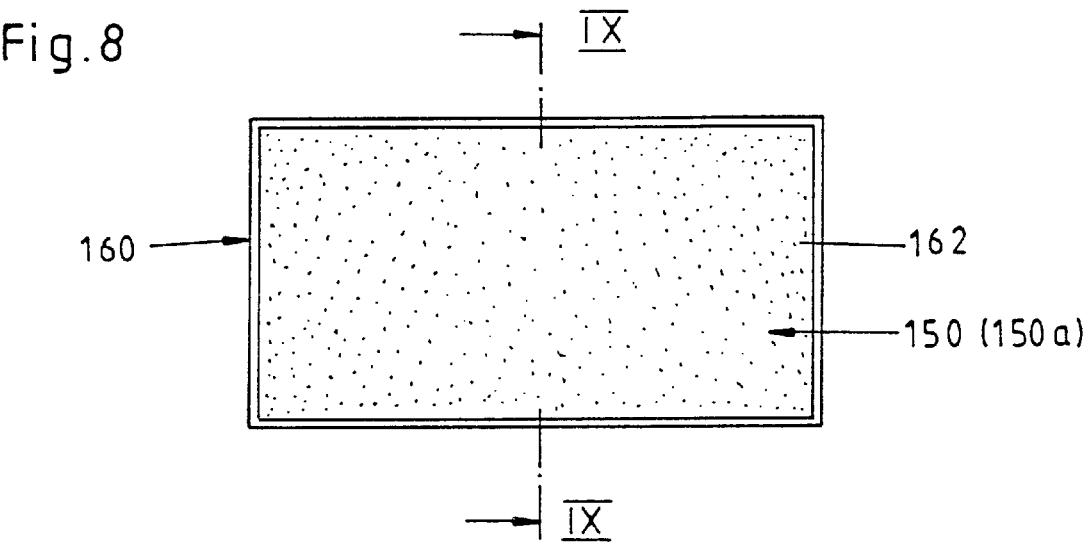
FIG. 8 shows a front view of a further embodiment with a surface contouring or macro roughening or macro serration of the wall surface area facing the carrier member of the friction material block.
Figure 9:
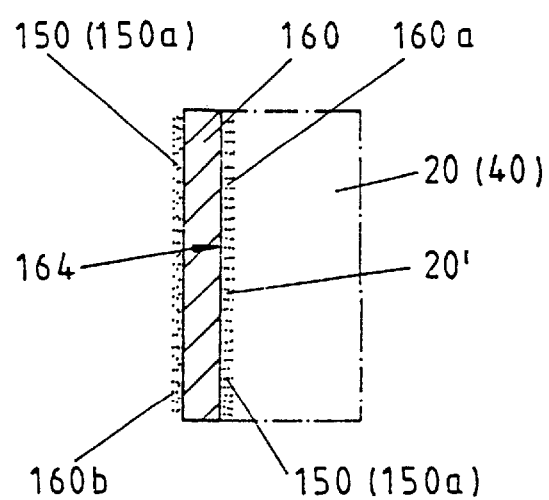
FIG. 9 shows a vertical section in the direction of the Line IX—IX in FIG. 8.

According to a further embodiment, the friction material block 20 or 40 can, on the wall area facing the carrier member 10, prior to being cast around, be provided with a surface contouring in the form of a mounting bed 150, in order to improve the bond between the friction material block and the carrier member. This mounting bed 150 may possess the most widely varying geometric forms, spherical configuration or suchlike (FIGS. 8 and 9). Furthermore, prior to the friction material block 20 or 40 being cast around, i.e. prior to the casting of the carrier member 10, the friction material block can be mounted on a carrying plate 160 which, on both its wall areas 160a,160b, is provided with a mounting bed 150.

In the FIGS. 8 to 12, a supporting or carrying plate known per se of metallic or other suitable materials is identified with 160, on which an indicated block 20 of a compressed mixture of friction material is disposed. In the embodiment according to FIGS. 8 and 9, the suporting plate 160 possesses, on the side 160a carrying the friction material block, a mounting bed 150 in the form of a structurally formed surface area, which is comprised of a basic layer 150a of shaped elements or shaped members 162, which preferably is compressed and thermally treated mixed from the material mixture of one higher melting proportion and one lower melting proportion in such a way that each individual shaped member 162 possesses undercuts, recesses and suchlike 164, in which case the shaped members may be comprised of any metallic material. In addition, the wall area 160b facing away from the friction material block 20 is also provided with a mounting bed 150.

Figure 10:
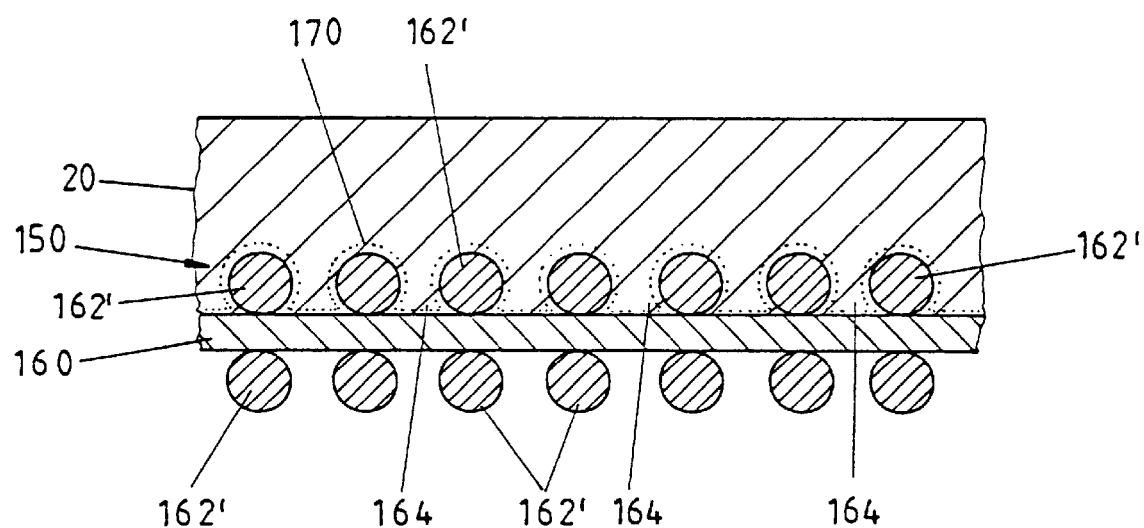
FIG. 10 shows a vertical section through a block of friction material with an applied carrier plate provided with mounting beds on both sides on the carrier plate wall areas in the form of spherical shaped members prior to the friction material block being cast around.

In the embodiment shown in FIG. 10, the mounting bed 150 is comprised of spherical shaped members 162' sinter-fused on to the carrier plate 160, which form undercuts 164 within the attachment area. On the mounting bed 150, e.g. a galvanic coating 170 of metal is applied, which surrounds the contours formed by the shaped members 162', in which case the coating 170 also follows the course of the undercuts, recesses and suchlike 164 so that a continuous metallic coating is obtained, thereby a good corrosion protection for the carrier plate 160 is provided at the same time, which preferably possesses a slight material thickness. The metallic coating 170 may be comprised of copper, silver, tin, cadmium, zinc or of some other suitable material. The further advantage produced by the galvanic metal coating resides in a precise dimensional accuracy with regard to the thickness of the coating. This dimensional accuracy is not possible neither with coatings of a varnish nor with a coating with powder. To this is added the circumstance that the metallic coating is applicable in a uniformity which cannot be achieved by other coating methods. In addition, the contours of the mounting bed 150 are preserved in their entirety, in spite of the metallic coating 170, a strong frictional connection and positive locking exists between the friction material and the rough base.

The mixture of friction material is pressed on to the carrier plate 160 provided with the mounting bed 150 with the aid of an appropriately shaped member in such a way that, during the pressing operation, the friction material flows into the interspaces between the individual shaped elements 162 (whose bizarre surface is inticated in Detail C in FIG. 14) into those spaces that are formed by undercuts, recesses and the like 164. In this manner, by means of the shaped elements 162, an intimate connection between the deforming friction material block 20 and the mounting bed 150, which cling to each other is provided. However, due to the properties of the material such a deformation of the mounting bed 150 and of its basic layer 150a takes place that the friction material acts upon the surface portions of the friction material accommodation area 20' not filled by the mounting bed so that a full-surface filling of the friction material accommodation area 20' takes place so that in this case none or only a very small number of free areas and free spaces results, whereby a penetration of moisture and the corrosion possibilities connected with this are avoided (FIG. 9).

Figure 11:
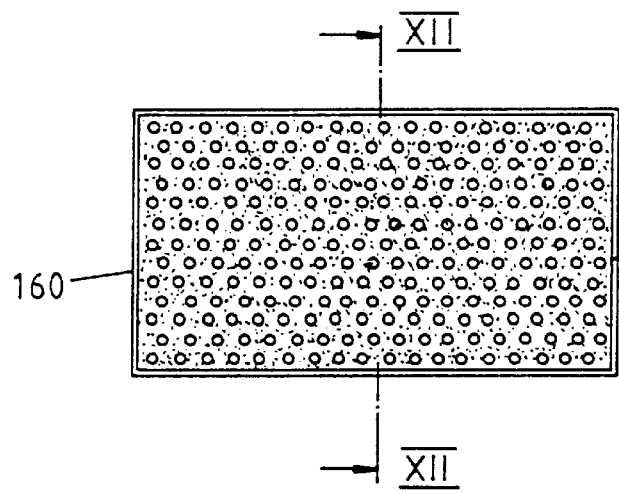
FIG. 11 shows in a view from above a carrier plate with a further embodiment of the applied mounting bed.
Figure 12:
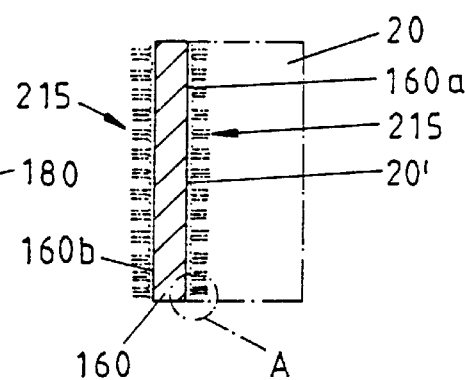
FIG. 12 shows a vertical section in the direction of the Line XII—XII in FIG. 11.
Figure 14:
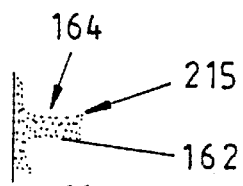
FIG. 14 shows in detailed views A, B and C, different constructions of the gripping elements forming the mounting bed.
Figure 14:
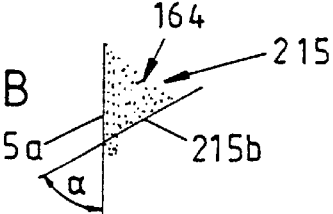
Figure 14:

A further embodiment is depicted in the FIGS. 11 and 12, in which the basic construction corresponds to the one shown in the FIGS. 8 and 9 and in which, on the basic layer 150a, gripping elements 180 are configured in the form of cylindrical or truncated columns or as truncated cones, as is indicated in the Detail A (FIG. 14). In this case, in a macro view, the gripping elements 180 are revealed as columns; in themselves they are formed as bizarre structures with undercuts, recesses and suchlike 164.

Figure 13:
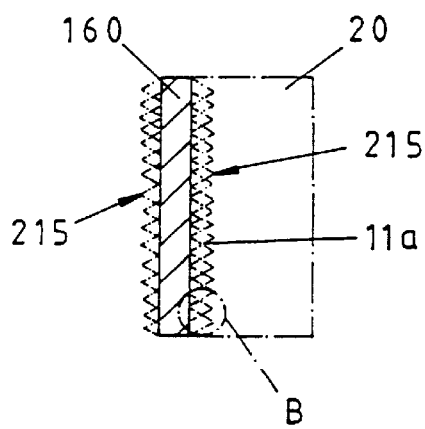
FIG. 13 shows in a sectioned view according to FIG. 11 a further embodiment of the applied mounting bed.

In FIG. 13, a further embodiment is illustrated, in which, in deviation from FIG. 12, the gripping elements are configured as pyramids with a triangular, square or polygonal base. In order to obtain in this case optimal mounting and wearing properties, provision is made here for the pyramidal angle between the pyramid base 215a and the pyramid side 215b is approximately 60°, as is indicated in the Detail B (FIG. 14).

The application of the metallic coating may be effected in a galvanic or thermal manner or be vapor deposition. There also exists the possibility of providing the carrier plate with a metallic coating, e.g. of copper prior to the roughening operation or prior to the application of the mounting bed. The rough ground is subsequently worked from the metallic coating.

If the carrier plate 160 is comprised of a thin piece of sheet metal, in that case it is provided with a contouring, e.g. a ribbing so that the inherent rigidity of the carrier plate 160 is increased.

If the friction material block 20 is provided with a contouring, such as a rib 21 (FIGS. 2 and 3), in that case the carrier plate 160 is provided with a corresponding contouring structure.

The friction material block 20 and the friction material block 40 are comprised of the same friction material mixtures as stated in the claims 1 to 7.

Figure 15:
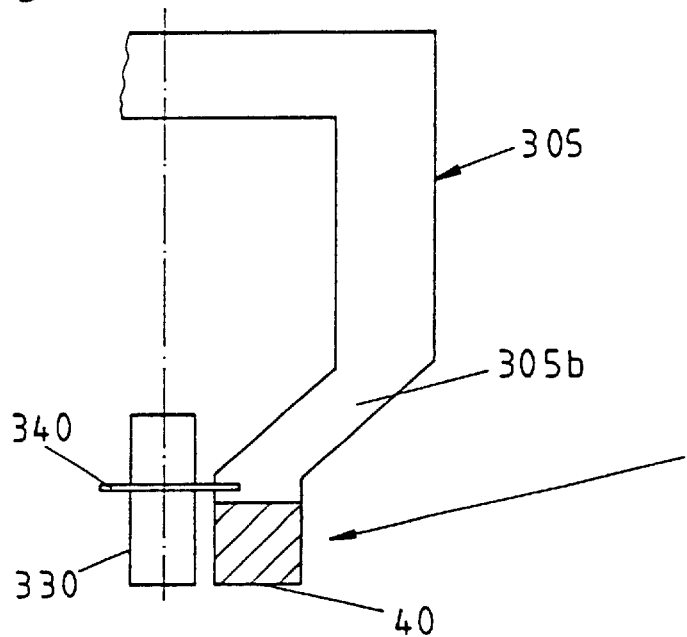
FIG. 15 shows a schematic view of a leg of the magnetic core of a magnetic track brake carrying a block of friction material on its free end with an antimagnetic intermediate strip allocated to the leg.
Figure 16:
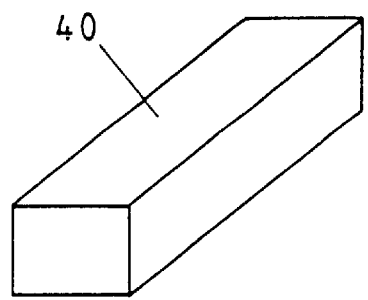
FIG. 16 shows in a diagrammatic view the block of friction material secured to the leg of the magnetic core as per FIG. 15.

According to the FIGS 15 and 16, on the free extremities of the legs 305a,305b—in the FIGS. 15, 17, 19, 21 solely the leg 305b is shown—of the magnetic core 305 of the magnetic track brake 300, friction material blocks of sintered friction material are disposed. The attachment of the friction material block 40 on the leg extremities is effected by sintering, welding or soldering. The antimagnetic intermediate strip 330 is connected to the legs of the magnetic core 305 by means of pinned or screwed connections. The antimagnetic intermediate strip 330 can be likewise fabricated from a sintered material according to any of claims 1–7 or from a wear-resistant spherulitic graphite iron, by way of example, GGG50, GGG60, GGG70, GGG80 or from a particle-reinforced spherulitic graphite iron.

Figure 17:
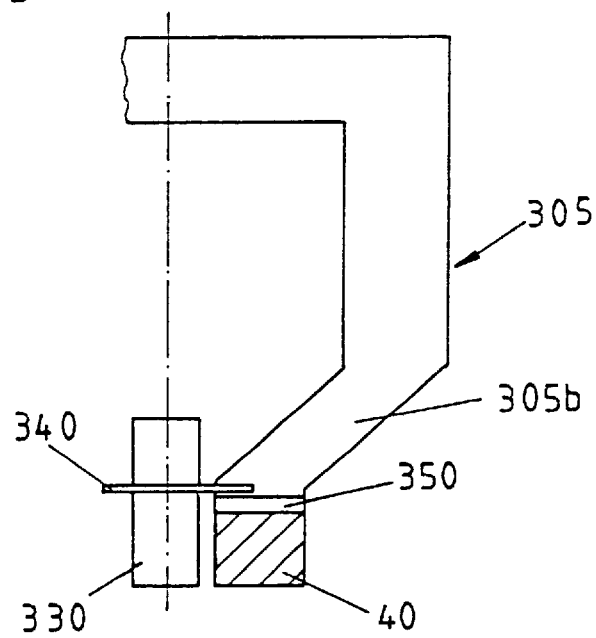
FIG. 17 shows a schematic view of a leg of the magnetic core of a magnetic track brake with the anti-magnetic intermediate strip allocated to the leg, wherein the leg carries on its free extremity a friction material block with an interposed steel plate.
Figure 18:
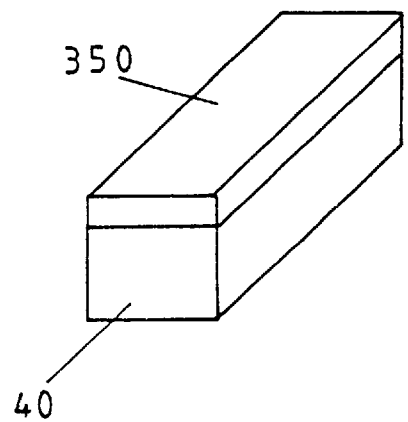
FIG. 18 shows in a diagrammatical view the friction material block secured to the leg of the magnetic core according to FIG. 17 with the steel plate secured to the latter.

In the embodiments shown in the FIG. 17 or 18, the attachment of the friction material block 40 on the legs of the magnetic core 305 is effected by the interposition of a steel plate 350. The steel plate 350 is connected with the aid of a welded connection with the respective leg of the magnetic core 305, whereas the attachment of the friction material block 40 to the steel plate is carried out by means of sinter-fusing, welding or soldering. The steel plate 350 can also be provided with a rough ground so as to provide a rigid connection between the steel plate and the block of friction material.

Figure 19:
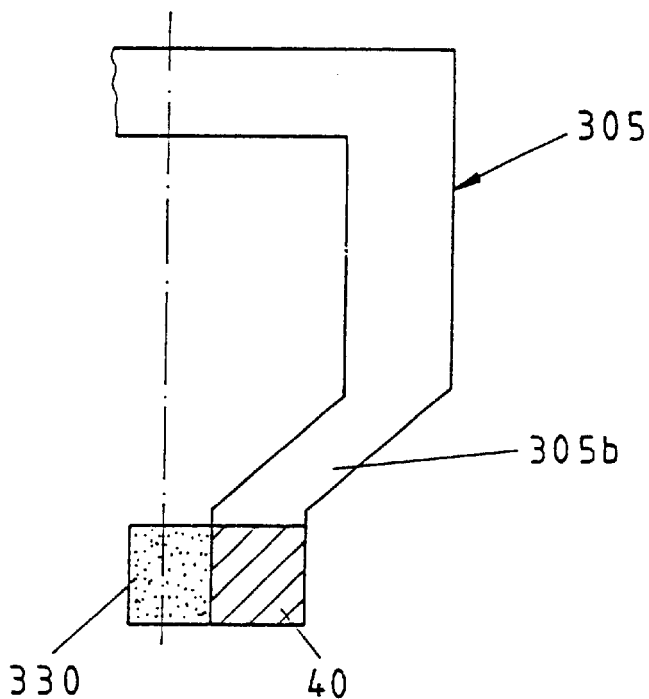
FIG. 19 shows a schematic view of a leg of the magnetic core of the magnetic track brake, wherein said leg carries on its free extremity a block of friction material with an antimagnetic intermediate strip secured to said block.
Figure 20:
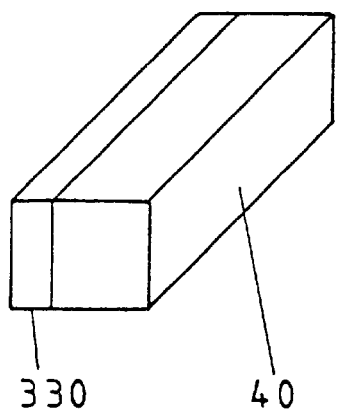
FIG. 20 shows in a diagrammatic view the friction material block secured to the leg of the magnetic core as per FIG. 19 with the antimagnetic intermediate strip secured to said leg.

In lieu of an attachment of the intermediate strip 330 to the legs of the magnetic core 305 with the aid of a pini8ng or screwing together, the intermediate strip 330 as per FIGS. 19 and 20 may also constitute an integrated component part of the friction material block 40, which, as stated hereinbefore relating to thre FIGS. 15 and 16, can be secured to the leg extremities. A non-positive connection between the friction material block 40 and the intermediate strip 330 is brought about. The connection can also be established by means of sinter-fusing, soldering and bonding. A connection in the manner of a sandwich may also be carried out, viz. by pressing and sintering.

The intermediate strip 330 can be attached to one of the friction material blocks 40 or to both friction material blocks.

Figure 21:
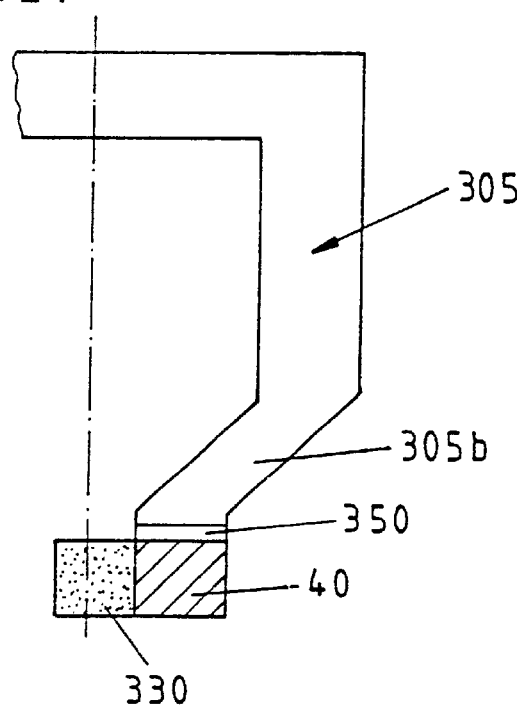
FIG. 21 shows a schematic view of a leg of the magnetic core of the magnetic track brake, wherein said leg carries on its free extremity a friction ,aterial block with in interposed steel plate and with an antimagnetic intermediate strip secured to the friction material block.
Figure 22:
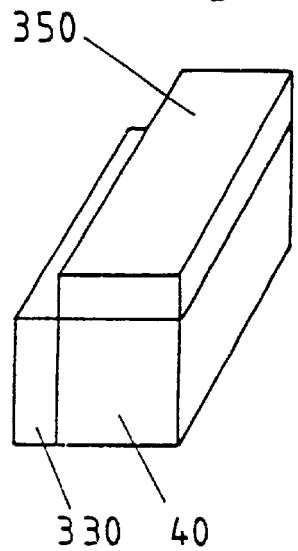
FIG. 22 shows in a diagrammatic view the friction material block secured to the leg of the magnetic core and with the antimagnetic intermediate strip secured to said friction material block.

As described relating to the FIGS. 17 and 18, the friction material block 40 may be connected with the integrated intermediate strip 330 as per FIGS. 19 and 20 also with the interposition of a steel plate 350 with the legs of the magnetic core 305 (FIGS. 21 and 22).

Figure 23:
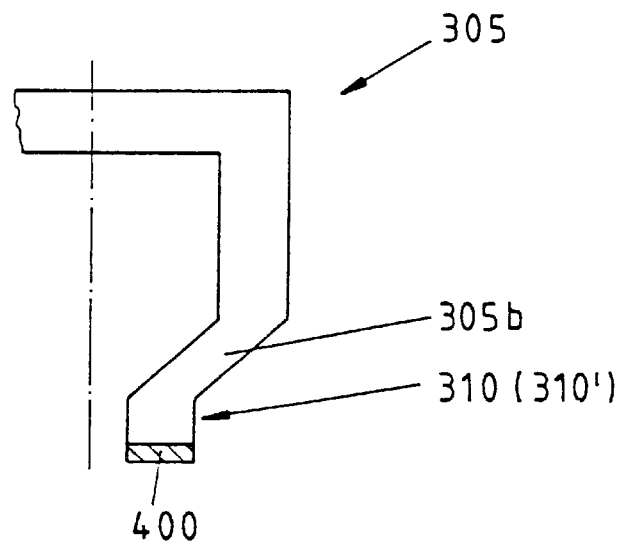
FIG. 23 shows in a schematic part view a pole shoe with a thin, wear-resistant and antimagnetic coating applied to the underside of the same.

According to FIG. 23, the sintered material according to the invention is applied to the underside of the pole shoes 310,310' forming the friction surface in the form of a thin, extremely wear-resistynt coating 400, which is shockproof and temprature-stable and prevents the baking on of build-up deposits. If the coating 400 is antimagnetically constructed, in that case the same possesses a high coefficient of friction so as to compensate the reduced magnetic power of attraction again. The maximally possible layer thickness of such assemblies results from the condition that the braking forces have to correspond to approximately those of conventional St37 links, i.e. from the reduction of the magnetic power of attraction and the possible compensation by means of the higher coefficient of friction.

Figure 24:
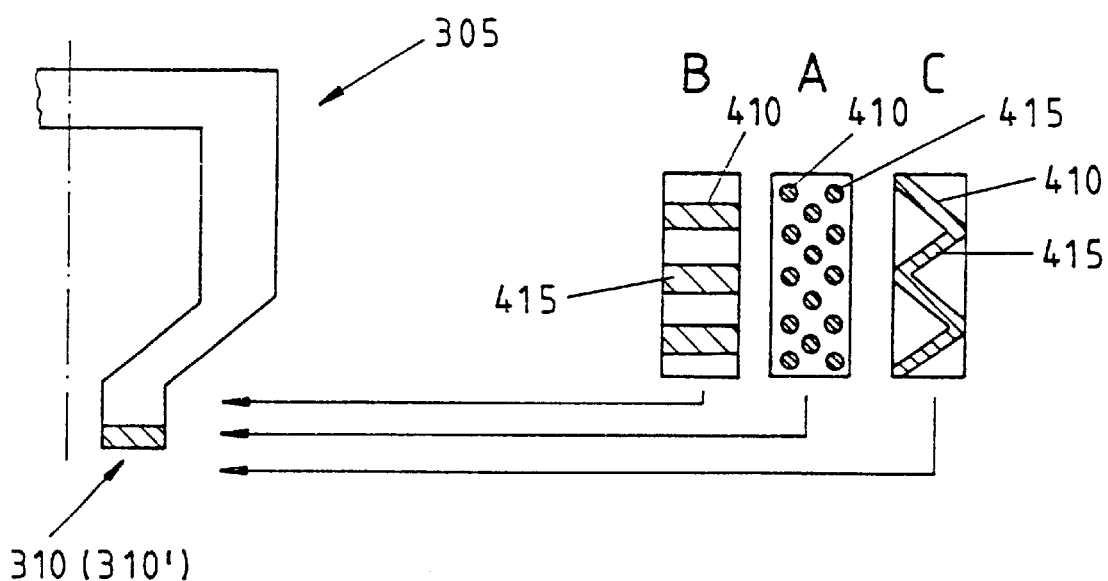
FIG. 24 shows in a schematic part view a pole shoe area, whose friction area is subdivided into regions having different tasks.

The FIG. 24 shows an embodiment, in which the friction surface of each pole shoe 310,310' is structurally subdivided into areas which produce the magnetic adhesion, so-called magnetic flux-carrying areas and such which take over the friction work and which preferably do not carry magnetic flux. For this, grooves, bores and recesses 410 are incorporated into the pole shoe friction surface, into which extremely wear-resistant, shockproof and temperature-stable (antimagnetic or magnetic) material 415 is introduced.

In FIG. 24, different embodiments of pole shoe friction surfaces are depicted identified with A, B, C, viz. with bores (A), with grooves (B) and with recesses possessing a zig-zag course (C). The introduced material 415 has in this case to possess a distinctly higher coefficient of friction than St37 in order to compensate the loss in power of adhesion due to the smaller flowed-through cross-sectional area.

The application of the coatings on the pole shoes or on their friction surfaces can be effected by means of one of the following possibilities or by a combination thereof:

direct flame spraying, high-speed flame, plasma or detonation spraying on plates that are welded to the pole shoes;

indirect sinter-fusing or melting-on of the coating material to the pole shoes;

direct sinter-fusing or melting-on of the coating material to the pole shoes;

sinter-fusing or melting-on of the coating material to plates and welding-on or brazing of these plates on to the pole shoes;

sinter-fusing or melting-on of tdhe coating material on to plates and fastening with screws of these plates to the pole shoes.

When coating the pole shoes 310,310' with extremely wear-resistant layers, the height of of the pole shoes should be preferably reduced from 20 mm to approximately 5 mm, whereby a saving in weight anf higher forces of attraction are achieved. However, a certain remaining height is necessary for the concentration of the magnetic flux.

When sintered pole shoes are employed that are solid pole shoes of sintered material, the same are attached as follows:

sinter-fusing on to plates and fastening with screws to said plates;

direct screwing-on of sintered pole shoes;

pressing/pushing-in of the friction material into form-fitting receptacles.

When using pole shoes 310,310' of material combinations, as casting around of pressed or cast part areas takes place. A fastening by means of screws or pins of plates with extremely wear-resistant material with efficiently magnetic pole shoe material is possible.

In this case the following materials are employed:

In the rmbodiment as per FIG. 23, ceramic or carbide coatings possessing an antimagnetic matrix, e.g. WC, $Cr_3C_2$ are used.

With pole shoes 310,310' possessing a wear-resistant, magnetically efficient coating, ceramic or carbide coatings with a magnetic matrix or sintered pole shoes with a pertinent FE proportion are employed.

In those cases where an intermediate strip 330 (FIG. 1) is disposed between the pole shoes 310,310', the latter may be comprised of ceramics, sintered metal (antimagnetic). Also carbide coatings (antimagnetic) fiber or particle-reinforced antimagnetic materials, e.g. particle-reinforced aluminum, carbon fiber composite or carbon fiber laminate may be employed—the same materials can also be employed with pole shoes, whose areas are structurally subdivided (FIG. 24).

Each pole shoe 310,210' consists, accoding to a first embodiment, structurally of different materials and areas, one of which assumes the generation of the magnetic adhesion, while the other assumes the performance of the friction work, whereas according to a second embodiment, each pole shoe 310,310' is comprised of one material which takes over the two tasks of generating magnetic adhesion and performing friction work.

Figure 25:
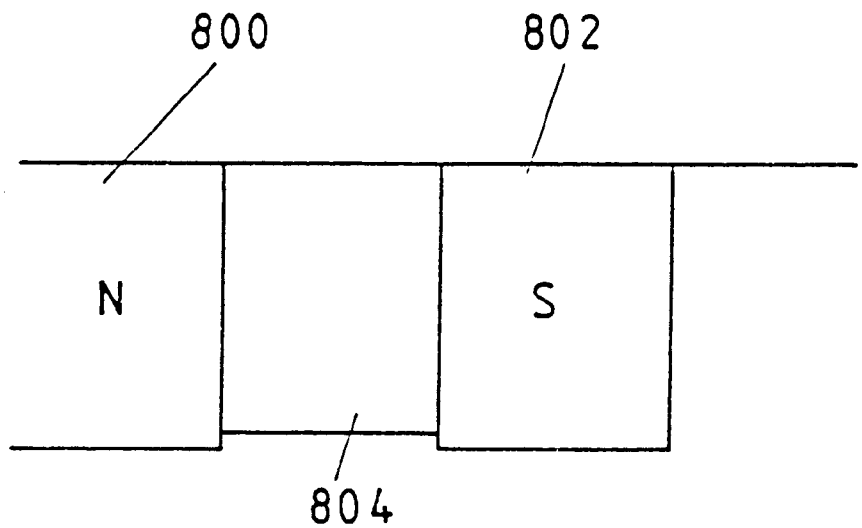
FIG. 25 shows an alternative embodiment of the invention in a permanently magnetic track brake.
Figure 26:
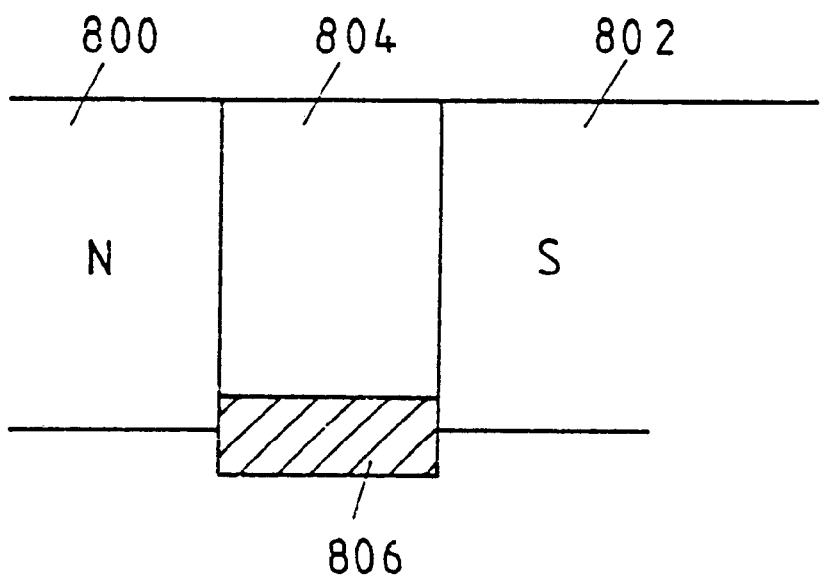
FIG. 26 shows a permanently magnetic track brake with a wear-resistant and shockproof coating within the area not carrying a magnetic flux.

In FIGS. 25 and 26, alternative embodiments according to the invention are illustrated.

The magnetic track brakes shown in the FIGS. 25 and 26 are permanent magnet track brakes, in which magnetic flux-carrying areas and non-magnetic flux-carrying areas alternate in the longitudinal direction of the brake.

Between the areas carrying magnetic flux 800,802, an area devoid of magnetic flux 804 is located. The magnetic flux-carrying area 800, 802 may be either comprised in its entirety of a sintered material according to the invention or else of a permanently magnetic material, on whose undersid a coating of the wear-resistant and extremely shockproof sintered material according to the invention is applied. As material for the area not carrying magnetic flux, steel is particularly suitable, by preference GGG50, GGG60, GGG70 or a particle-reinforced spherulitic graphite iron.

In the embodiment depicted in FIG. 25, merely the permanently magnetic areas 800,802 are in constant contact with the track.

In FIG. 26, an alternative embodiment of a permanent magnetic track brake is illustrated. Again magnetic flux-carrying areas 800,802 are separated from areas not carrying magnetic flux 804. In the present embodiment example, the area not carrying magnetic flux is, by way of example, a cast material, whose friction surface, which comes in contact with the track head, is constructed in the form of a coating with the sintered material according to the invention. The coating 806 is applied to the carrier or basic member of cast metal by way of example by means of flame spraying.

All the percentage statements for the mixture of friction material made in the foregoing text refer to percentages by weight.

What is claimed is:

1. Sintered material as friction material for a pole shoe area of a magnetic track brake comprising at least one of a magnetic basic member and a carrier member, wherein the sintered material comprises:
  a proportion of 0.5 to 2% of pulverized wear inhibitor comprising at least one of the substances selected from the group consisting of $Al_2O_3$, $ZrO_2$, $Al_2TiO_5$, $Y_2O_3$, SiC, $Si_3N_4$, WC, $Cr_3C_2$, and TiC;
  a proportion of 0.5 to 10% of powder forming a protective layer comprising at least one of the substances selected from the group consisting of spherulitic graphite iron, graphite, iron sulfide, manganese sulfide, lead, and molybdenum sulfite; and
  80% to 99% of at least one of a magnetically conductive material and a magnetically non-conductive material, wherein the magnetically conducting material comprises at least a proportion of iron and the non-conductive material comprises at least one of the substances selected from the group consisting of tin, copper, zinc, aluminum and alloys thereof.

2. Magnetic track brake
  comprising at least one of a magnetic base member and a carrier material and
  a pole shoe area having a magnetic flux-carrying area and a magnetic flux-separating area,
wherein at least one of the magnetic flux-carrying area and the magnetic flux-separating area comprises, at least in part, in the form of a friction material, a sintered material according to claim 1.

3. Track brake according to claim 2, wherein at least one of the friction material block (20, 40) and/or a coating on the wall area facing at least one of the basic member and the carrier member (10, 30) possesses such a surface contouring that, for increasing the strength of the connection between the at least one of friction material block (20, 40) and the coating and the at least one of the basic member and carrier member (10, 30), a macro serration is formed.

4. Track brake according to claim 3, wherein the surface contouring is a mounting bed (150) comprised of a material mixture having a proportion (A) that possesses a lower melting point and a proportion (B) that possesses a higher melting point.

5. Track brake according to claim 4, wherein the lower-melting proportion (A) is comprised of approximately 30% bronze and the higher-melting proportion (B) is comprised of approximately 70% FE powder.

6. Track brake according to claim 5, wherein the bronze employed possesse a proportion of 10% tin.

7. Track brake according to claim 4, wherein the sinterfused mounting bed (150) is comprised of a basic layer (150a) covering at least in part the carrier member (160) within the area of a friction material accommodation surface (20'), said basic layer consisting of individual frictional and form-fitting shaped elements (11) having undercuts and recesses (164).

8. Track brake according to claim 7, wherein on the basic layer (150a), gripping elements are provided and spaced at a distance from each other.

9. Track brake according to claim 4, wherein the low-melting proportion (A) is a low-melting metal or a low-melting alloy.

10. Track brake according to claim 4, wherein the higher-melting proportion (B) is selected from the group consisting of sand and ceramic powder.

11. Track brake according to claim 4, wherein the melting point of the higher-melting proportion (B) lies below the melting point of the carrier plate (160).

12. Magnetic track brake according to claim 2, wherein the magnetic flux-separating area is an intermediate strip proceeding in the longitudinal direction of the magnetic track brake.

13. Track brake according to claim 12, wherein the intermediate strip (330) is disposed in the interspace (315) between the pole shoes (310,310') of the magnetic track brake and is detachably connected with the pole shoes (310,310') by pinning or screwing fast, or non-detachably connected by being welded on, sprayed-on or by sinter-fusing.

14. Track brake according to claim 13, wherein the magnetic track brake comprises a magnetic core (305) possessing free legs (305a,305b), wherein blocks of friction material (40) are disposed on the extremities of the free legs and are secured to the legs by a method selected from the group consisting of sintering, welding, bonding and soldering.

15. Track brake according to claim 14, wherein the antimagnetic intermediate strip (330) between the two legs (305a,305b) of the magnetic core (305) is connected by pinning or screwing (340) with the legs.

16. Track brake according to claim 13, wherein the magnetic track brake comprises a magnetic core (305) possessing free legs (305a,305b), wherein blocks of friction material (40) having a steel plate (350) are secured with interposition of the steel plate (350) to the legs, wherein the steel plate (350) is secured be welding to the leg (305a;305b) of the magnetic core (305) and the friction material block (40) is secured to the steel plate (350) by a method selected from the group consisting of sintering, welding, bonding, soldering and positive-locking by a rough ground formed on the surface of the steel plate.

17. Track brake according to claim 2, wherein the friction material comprises at least in part a wear-resistant spherulitic graphite iron.

18. Track brake according to claim 17, wherein the spherulitic graphite iron is selected from the group consisting of GGG50, GGG60, GGG70, GGG80, and a particle-reinforced spherulitic graphite iron.

19. Magnetic track brake according to claim 2, wherein the friction material is configured as a friction material block associated to at least one of the magnetic flux carrying area and the magnetic flux separating area.

20. Track brake according to claim 2, wherein the at least one of the basic member and carrier member comprises a sintered material according to claim 1.

21. Track brake according to claim 2, wherein the at least one of the basic member and carrier member comprises at least one of the substances selected from the group consisting of grey cast iron, spherulitic graphite iron and cast steel.

22. Sintered material according to claim 1, wherein the wear inhibitor of the sintered material has the following composition:
  80% to 99% of at least one of a magnetically conductive and magnetically non-conductive material
  0.5% to 5% molybdenum sulfite
  0.5% to 5% carbon
  0.5% to 2% silicon carbide.

23. Pole shoe for a magnetic track brake, wherein the pole shoe is comprised of a sintered material according to claim 1.

* * * * *